3,188,634
DISTANCE MEASURING SYSTEM WITH AUTOMATIC INDEX COMPENSATION

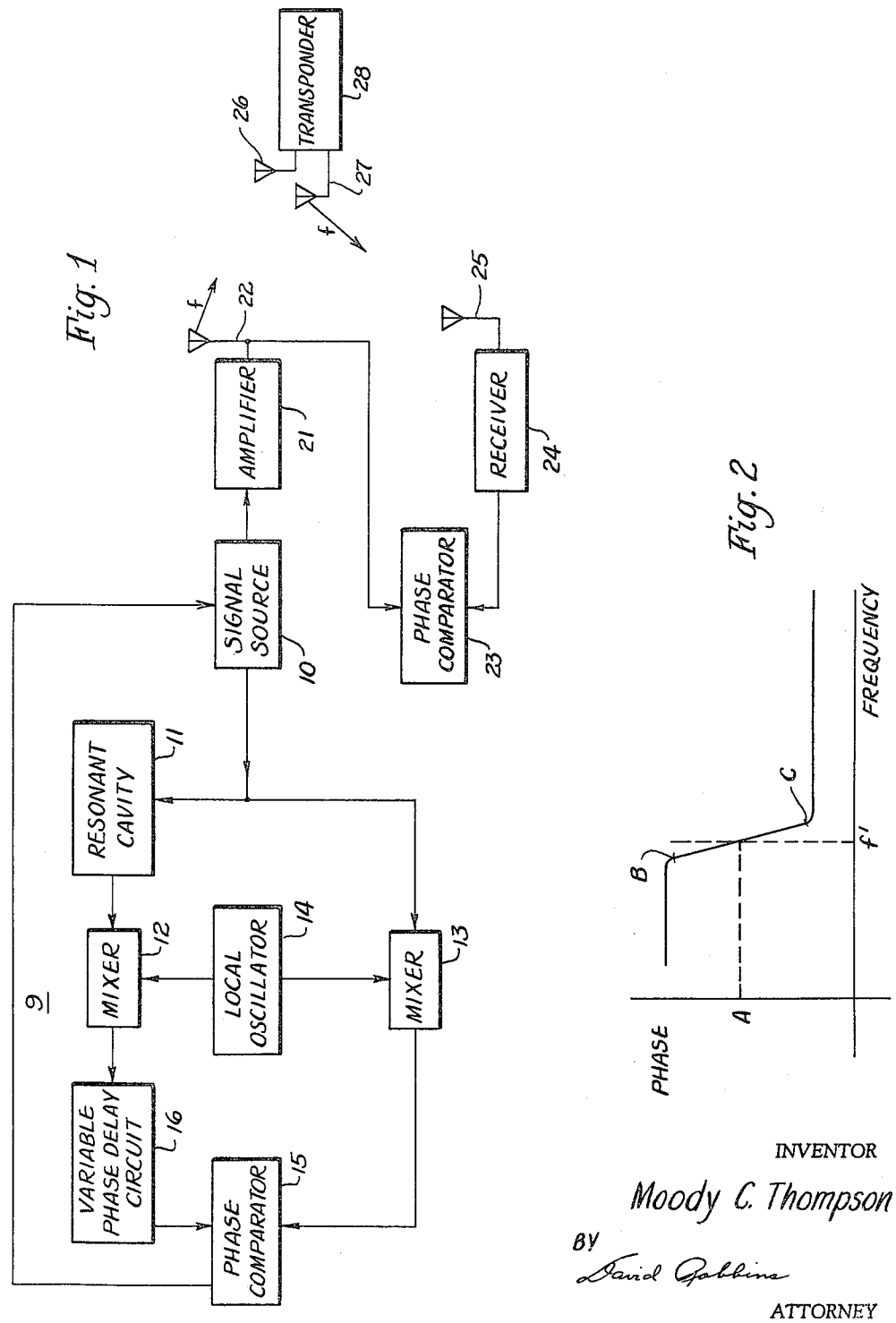

Moody C. Thompson, Jr., Boulder, Colo., assignor to the United States of America as represented by the Secretary of Commerce
Filed Dec. 28, 1961, Ser. No. 163,001
5 Claims. (Cl. 343—12)

This invention relates to an electronic distance measuring system having automatic compensation for the refractive index of the medium through which a measuring frequency is transmitted.

In on electronic distance measuring system known in the prior art, a frequency, generated at a local station, is transmitted to a distant station and then retransmitted to the local station. The phase shift in the frequency occurring during the round trip is measured and used in the following equation to calculate the distance between the stations.

$$\theta = \frac{nfD}{c} \quad (1)$$

where $\theta$ = phase shift
$f$ = measuring frequency
$c$ = velocity of light in a vacuum
$n$ = average index of refraction along the path between the stations
$D$ = distance between stations.

From Equation 1 it is seen that before distance D is calculated, it is necessary to determine the average index of refraction $n$ along the path. The index is determined in current practice by calculation from measurements of the atmospheric pressure, temperature and relative humidity. This requires the use of psychrometer and barometer readings at one or both stations and the use of empirically derived coefficients. Consequently the system has several inherent disadvantages, one being the errors introduced in taking the psychrometer and barometer readings and in the coefficients that are used to convert these readings into refractive index values. Another is the time required to take the readings and make the necessary calculations.

Accordingly, an object of the present invention is to provide an electronic distance measuring system that compensates automatically for changes in the refractive index of the atmosphere.

This is accomplished by controlling the measuring frequency $f$ so that it changes in an inverse relationship to changes in the index of refraction $n$.

As an example, assume that correction for the refractive index $n_1$ at one station will provide sufficient accuracy. Then $$\theta = \frac{n_1 f D}{c} \quad (2)$$

Because of changes in the atmosphere, $n_1$ will undergo large variations during the measuring periods. The measuring frequency $f$, however, having an inverse relationship to $n_1$ compensates for these variations; thus $\theta$ becomes substantially stable.

In the figures:

FIG. 1 is an embodiment of the present invention; and
FIG. 2 is a curve of the relationship between the frequency and phase of a signal applied to resonant cavity 11 in FIG. 1.

Referring to FIG. 1, the frequency controlling circuit 9 for signal source 10 includes resonant cavity 11, mixers 12 and 13, local oscillator 14, phase comparator 15 and variable phase delay circuit 16. The output of the signal source is applied in parallel to mixer 13 and cavity 11, which is open to and samples the atmosphere. The cavity is connected to mixer 12. The output of oscillator 14 is applied in parallel to the mixers, while the output of mixer 12 is fed through variable phase delay circuit 16 to comparator 15 and the output of mixer 13 is fed directly to the phase comparator. Any variety of conventional phase delay circuits, comparators and resonant cavities may be used. The error D.C. signal provided by phase comparator 15 is applied in the proper polarity to an appropriate place in signal source 10. If the source employs a klystron tube, for example, the output of the phase comparator may be applied to the repeller of the latter and the various connections may be made with appropriate waveguides.

Referring to FIG. 2, at frequency $f'$, which is selected to be the resonant frequency of cavity 11, the phase shift between the input and the output signals of the resonant cavity is equal to A. Since the error signal provided by phase comparator 15 is dependent upon the slope of line BC, the delay inserted by phase delay circuit 16 is selected so that in a preferred mode of operation, resonant cavity 11 will function at point A, which is substantially in the center of line BC. This will insure that compensating circuit 9 will operate in its most sensitive region.

In the operation of frequency controlling circuit 9, delay circuit 16 is adjusted so that signal source 10 generates a frequency equal to that of the resonant frequency $f'$ of cavity 11. If the refractive index increases, since cavity 11 is open to the atmosphere, frequency $f'$ will decrease and an error signal is developed in phase comparator 15, which, applied to signal source 10, forces the latter to operate on the center frequency of the cavity. Similarly, if the refractive index decreases, the frequency of source 10 will increase. Thus, the measuring frequency $f$, provided by source 10, is inversely proportional to the index of refraction $n_1$ of the atmosphere, i.e., $$f = \frac{k}{n_1}$$

at the local station.

Referring again to FIG. 1, the output of signal source 10 is applied to amplifier 21, is amplified therein and fed to antenna 22 and phase comparator 23. The output of receiver 24 is also fed to the comparator and antenna 25 is connected to the receiver. In the distant station, receiving and transmitting antennas 26, 27 are connected to transponder 28.

In a typical operation of the embodiment in FIG. 1, assume that it is desired to measure the distance between antenna 22 in the local station and antenna 26 in the distant station. The measuring frequency, generated by source 20 is transmitted by antenna 20 and is also fed to comparator 23. Received on antenna 26, the frequency is retransmitted by antenna 27 to the local station, received on antenna 25 and fed through receiver 24 to phase comparator 23. The phase comparator indicates the difference in phase between the frequency as transmitted by antenna 22 and as received by antenna 25.

Since $$f = \frac{k}{n_1}$$

Equation 2 becomes:

$$\theta = \frac{kD}{c} \text{ or } k'D \quad (3)$$

and $\theta$ no longer fluctuates with a change in refractive index. As a consequence, distance D can be calculated directly from Equation 3, and it is no longer necessary to rely on psychrometer and barometer readings or on the accuracy of empirically determined coefficients relating such measurements to refractive index.

Obviously, many modifications of the present invention are possible in the light of the above teachings. For example, an automatic correction for the refractive index of the atmosphere could be made at more than one point between the stations, or instead of transponder 28, a receiver in the distant station could be connected directly to phase comparator 23 by means of a suitable cable. It is therefore to be understood, that within the scope of the appendent claims, the invention may be practiced otherwise than as specifically described.

What is claimed is:

1. A distance measuring system having automatic compensation for the refractive index of the medium through which a measuring frequency is transmitted comprising: a local station including a signal source for generating and means for transmitting said measuring frequency, a resonant cavity open to said medium and having a resonant frequency substantially equal to said measuring frequency, means for applying the output of said signal source to said resonant cavity, means for providing a control signal having a magnitude dependent upon the phase relationship between the outputs of said source and said cavity, means for applying said control signal to said source, a distant station including means for receiving and for resending the frequency to said local station, and means for measuring the difference in phase between the frequency as transmitted to said distant station and as received at said local station.

2. The distance measuring system set forth in claim 1 wherein the means for providing said control signal comprises: a phase comparator having one input connected to the output of said signal source and a variable phase delay circuit positioned between the output of said resonant cavity and another input to said phase comparator.

3. A distance measuring system having automatic compensation for the refractive index of the medium through which a measuring frequency is transmitted comprising: a local station including a signal source for generating and means for transmitting said measuring frequency, a resonant cavity open to said medium and having a resonant frequency substantially equal to said measuring frequency, means for applying the output of said source to said cavity, a pair of mixers, means for applying the output of said source to one and the output of said cavity to the other of said pair of mixers, a local oscillator, means for applying the output of said local oscillator in parallel to said mixers, means for providing a control signal having a magnitude dependent upon the phase relationship between the outputs of said mixers, means for applying said control signal to said source, a distant station including means for receiving and resending the frequency to said local station, and means for measuruing the difference in phase between the frequency as transmitted to said distant station and as received at said local station.

4. The distance measuring system set forth in claim 3 wherein the means for providing said control signal comprises: a phase comparator having one input connected to the output of one of said mixers and a variable phase delay circuit positioned between the outuput of the other of said mixers and another input to said phase comparator.

5. In a distance measuring system having automatic compensation for the refractive index of the medium through which a measuring frequency is transmitted, a local station comprising: a signal source for generating a measuring frequency, means responsive to said measuring frequency and to the refractive index of said medium for generating a first frequency whose magnitude varies inversely with said refractive index, means responsive to said first frequency and said measuring frequency for providing a control signal, means for applying said control signal to said signal source, and means for transmitting said measuring frequency through said medium to a distant station; said distant station including means for receiving and resending the measuring frequency to said local station; and means for measuring the difference in phase between the measuring frequency as transmitted to said distant station and as received at said local station.

References Cited by the Examiner

UNITED STATES PATENTS

| | | | |
|---|---|---|---|
| 2,125,977 | 8/38 | Zworykin | 343—117 |
| 2,470,787 | 5/49 | Nosker | 343—105 |
| 2,480,646 | 8/49 | Grabau | 340—5 |
| 2,865,196 | 12/58 | Bordenave et al. | 340—5 |
| 3,068,469 | 12/62 | Werner | 343—5 |

CHESTER L. JUSTUS, *Primary Examiner*.